United States Patent
Yamada et al.

(10) Patent No.: US 12,351,978 B2
(45) Date of Patent: Jul. 8, 2025

(54) INK JET TEXTILE PRINTING METHOD AND RECORDING APPARATUS

(71) Applicant: Seiko Epson Corporation, Tokyo (JP)

(72) Inventors: Akiko Yamada, Shiojiri (JP); Hideki Okada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 750 days.

(21) Appl. No.: 17/586,919

(22) Filed: Jan. 28, 2022

(65) Prior Publication Data

US 2022/0243392 A1 Aug. 4, 2022

(30) Foreign Application Priority Data

Jan. 29, 2021 (JP) ................. 2021-012857

(51) Int. Cl.
| | |
|---|---|
| *D06P 5/30* | (2006.01) |
| *B41J 3/407* | (2006.01) |
| *C09D 11/322* | (2014.01) |
| *D06P 1/44* | (2006.01) |
| *B41J 11/00* | (2006.01) |

(52) U.S. Cl.
CPC .............. *D06P 5/30* (2013.01); *B41J 3/4078* (2013.01); *C09D 11/322* (2013.01); *D06P 1/445* (2013.01); *B41J 11/007* (2013.01)

(58) Field of Classification Search
CPC ....... B41M 5/52; B41M 5/0047; C09D 11/54; C09D 11/322; C08L 39/00; B41J 2/21; B41J 11/00; B41J 3/407; B41J 3/4078; B41J 11/007; B41J 15/048; D06P 1/54; D06P 1/52; D06P 5/30; D06M 10/00
See application file for complete search history.

(56) References Cited

U.S. PATENT DOCUMENTS

| | | | |
|---|---|---|---|
| 5,345,863 A * | 9/1994 | Kurata | B41J 3/4078 340/676 |
| 6,326,323 B1 | 12/2001 | Shimano et al. | |
| 11,897,254 B2 * | 2/2024 | Sawase | C09D 11/101 |
| 2005/0239963 A1 * | 10/2005 | Kitano | C08F 297/02 525/88 |

(Continued)

FOREIGN PATENT DOCUMENTS

| | | |
|---|---|---|
| EP | 3342595 A1 | 7/2018 |
| EP | 3403833 A1 | 11/2018 |

(Continued)

OTHER PUBLICATIONS

Editor-in-Chief Wu Zanmin, "Cleaner Dyeing and Finishing Processing Technology of Textiles", China Textile & Apparel Press, Jan. 31, 2007, with English translation (6 Pages).

(Continued)

*Primary Examiner* — John Zimmermann
(74) *Attorney, Agent, or Firm* — Harness, Dickey & Pierce, P.L.C.

(57) ABSTRACT

An ink jet textile printing method of textile printing on a fabric includes mounting and supporting the fabric on an endless belt having an adhesive layer, and adhering an ink containing a pigment, resin particles, and water by an ink jet method. The fabric is a fabric composed of hydrophobic fibers, and the fabric is a fabric treated with a cationic polymer.

7 Claims, 2 Drawing Sheets

(56) References Cited

U.S. PATENT DOCUMENTS

| | | | |
|---|---|---|---|
| 2013/0278690 A1* | 10/2013 | Saito | C09D 11/40 |
| | | | 347/102 |
| 2016/0101629 A1* | 4/2016 | Sawase | B41J 29/38 |
| | | | 347/7 |
| 2016/0129693 A1* | 5/2016 | Moriwaki | B41J 2/1652 |
| | | | 347/14 |
| 2019/0003115 A1 | 1/2019 | Ohashi et al. | |
| 2019/0284421 A1* | 9/2019 | Sekiguchi | C09D 11/40 |
| 2020/0040523 A1 | 2/2020 | Miyasa et al. | |
| 2021/0221149 A1* | 7/2021 | Nakamura | B41J 11/00214 |
| 2021/0363694 A1* | 11/2021 | Zhou | C09D 133/02 |

FOREIGN PATENT DOCUMENTS

| | | |
|---|---|---|
| JP | H04-327262 A | 11/1992 |
| JP | H11-293571 A | 10/1999 |
| JP | 2018-192733 A | 12/2018 |
| JP | 2019-011528 A | 1/2019 |

OTHER PUBLICATIONS

Li Luhai, "Printing & Packaging Functional Materials", China Light Industry Press, Jan. 31, 2013, with English translation (10 Pages total, including pp. 30-31).

\* cited by examiner

INK JET TEXTILE PRINTING METHOD AND RECORDING APPARATUS

The present application is based on, and claims priority from JP Application Serial Number 2021-012857, filed Jan. 29, 2021, the disclosure of which is hereby incorporated by reference herein in its entirety.

BACKGROUND

1. Technical Field

The present disclosure relates to an ink jet textile printing method and a recording apparatus.

2. Related Art

There has been known a textile printing method for recording images on fabrics such as a woven fabric, a knit, and a nonwoven fabric, and the like. A screen textile printing method is widely used as a textile printing method, but the use of an ink jet recording system has recently been investigated from the viewpoint that an ink used for textile printing can be efficiently used. Specifically, a textile printing method (also referred to as an "ink jet textile printing method" hereinafter) using an ink jet recording system records an image on a baric by ejecting ink droplets from nozzles of a recording head and adhering the droplets to the fabric.

For example, JP-A-2018-192733 discloses a printing apparatus in which a medium, such as a fabric or the like, as a textile printing object is transported by a transport belt, and an ink is ejected from a recording medium and adhered to the medium.

In an ink jet textile printing method using an ink containing a pigment, from the viewpoint of improving the color development of the resultant textile printing product, the ink is adhered after a fabric is treated with a pretreatment solution containing a cationic component. However, the fabric is a recording medium through which a liquid can easily permeate, and thus the ink may partially permeate to the surface at the back of the side where the ink is adhered to the fabric. In particular, the ink significantly permeates through a fabric composed of hydrophobic fibers, such as polyester. In this case, it becomes clear that even the cationic component used for treating the fabric may permeate together with the ink to the back surface of the fabric. In this case, it also becomes clear that the ink and the cationic component are adhered to the belt transported while supporting the fabric and are reacted on the belt, thereby producing an aggregate.

The aggregate on the belt is hardly washed, and an aggregate is also produced in the waste water of washing the belt, thereby causing a problem of contamination of the belt with the ink and cationic component.

SUMMARY

According to an aspect of the present disclosure, an ink jet textile printing method for printing on a fabric, the method including mounting and supporting the fabric on an endless belt having an adhesive layer, and adhering an ink, which contains a pigment, resin particles, and water, by an ink jet method. The fabric is a fabric composed of hydrophobic fibers and is a fabric treated with a cationic polymer.

According to an aspect of the present disclosure, a recording apparatus performs recording by the ink jet textile printing method according to the aspect described above,

DESCRIPTION OF EXEMPLARY EMBODIMENTS

Figure 1:
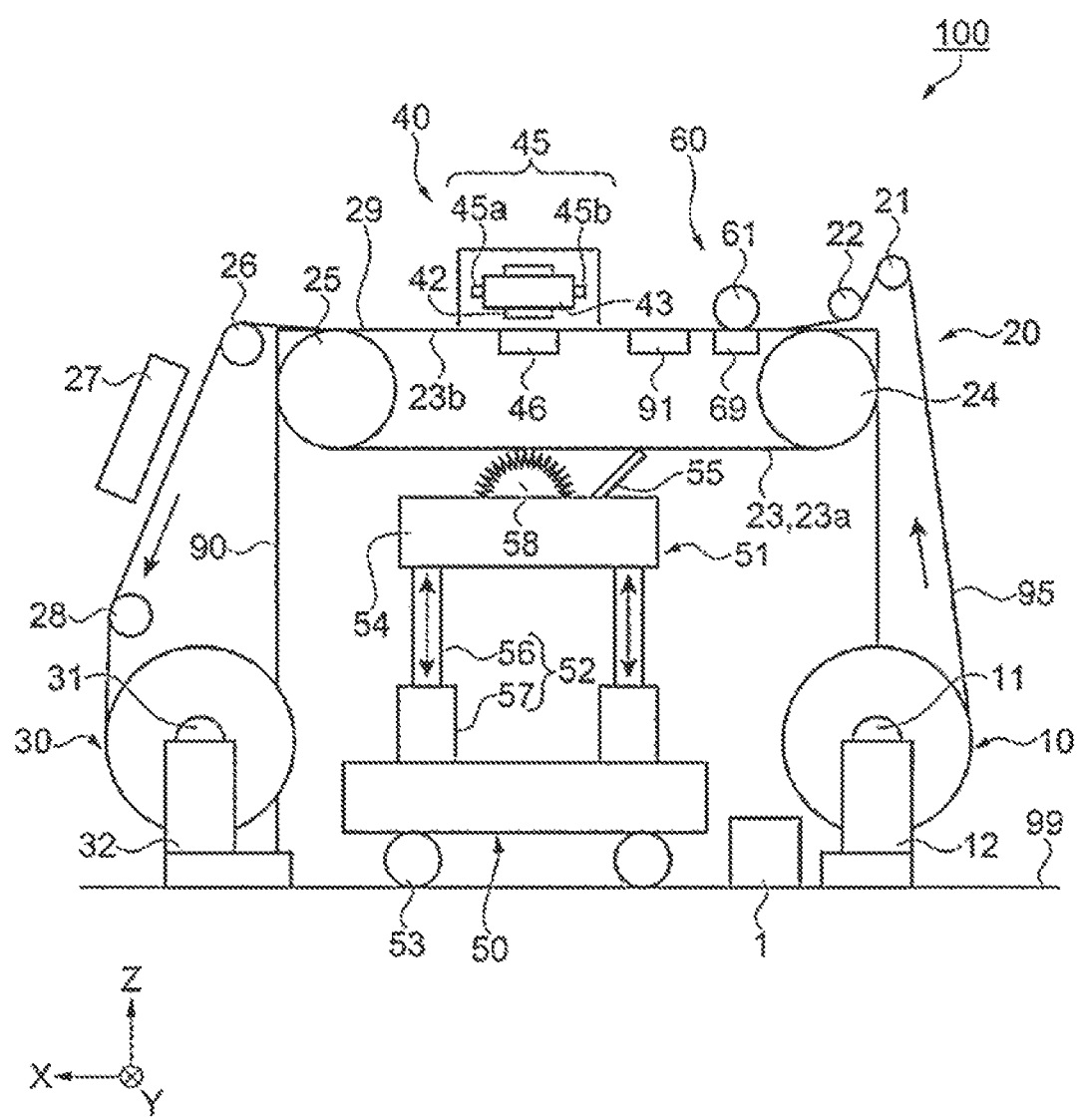
FIG. 1 is a schematic view showing the schematic overall configuration of a recording apparatus which can be used in an ink jet textile printing method according to an embodiment of the present disclosure.

Embodiments of the present disclosure are described below. The embodiments described below describe examples of the present disclosure. The present disclosure is not limited to the embodiments below and includes various modifications carried out within a range not changing the gist of the present disclosure. All configurations described below are not necessarily essential configurations for the present disclosure.

1. Ink Jet Textile Printing Method

An ink jet textile printing method according to an embodiment of the present disclosure is an ink jet textile printing method for printing on a fabric, the method including mounting and supporting the fabric on an endless belt having an adhesive layer, and adhering an ink, which contains a pigment, resin particles, and water, by an ink jet method. The fabric is a fabric composed of hydrophobic fibers and is a fabric treated with a cationic polymer.

An ink jet textile printing method for printing on a fabric (adhering an ink on the surface of a fabric) uses a recording apparatus in which the fabric is transported by an endless belt formed in an endless shape by coupling both ends of a strip-shaped belt. The endless belt having an adhesive layer can fix the fabric and can stably transport, particularly, even a relatively thin and easily stretchable fabric. However, when an ink and cationic component permeate to the back surface and produce an aggregate on the endless belt, the aggregate is easily captured by the adhesive layer, and thus contamination of the belt becomes more remarkable. Further, in particular when the fabric is composed of hydrophobic fibers, the ink and cationic component more easily permeate to the back surface, and thus the belt is more easily contaminated.

On the other hand, in the ink jet textile printing method according to the embodiment of the disclosure, the cationic component used for treating the fabric is a cationic polymer, and such a cationic polymer is a cationic component having a relatively large molecular weight and is thus supposed to be easily fixed to the fabric. Thus, in textile printing on a fabric, the cationic component can be prevented from permeating together with the ink to the back surface of the fabric, and thus contamination of the belt can be decreased. In addition, the cationic component is easily staid on the surface of the fabric, and thus excellent color development can be exhibited.

Each of the processes of the ink jet textile printing method according to the embodiment of the disclosure is described below.

1.1. Supporting

The ink jet textile printing method according to the embodiment of the disclosure includes mounting and supporting the fabric on the endless belt having the adhesive layer. A recording apparatus provided with the endless belt having the adhesive layer, which can be used for supporting, and the fabric are described below.

1.1.1. Recording Apparatus

In supporting, the ink jet textile printing method according to the embodiment of the disclosure preferably uses the recording apparatus provided with the endless belt having the adhesive layer. A recording apparatus 100 provided with an endless belt having an adhesive layer, which can be preferably used in supporting, is described with reference to the drawings.

In FIG. 1, the scale of each layer or member is differentiated from the actual scale in order to make the size of each layer or member substantially recognizable. Also, in FIG. 1, for the shake of convenience of description, the X axis, Y axis, and Z axis are shown as the three axes perpendicular to each other, and the head side of an arrow showing an axial direction is referred to as the "+ side" and the base end side is referred to as the "− side". The direction parallel to the X axis is referred to as the "X-axis direction", the direction parallel to the Y axis is referred to as the "Y-axis direction", and the direction parallel to the Z axis is referred to as the "Z-axis direction".

Schematic Configuration of Recording Apparatus

FIG. 1 is a schematic drawing showing the schematic overall configuration of the recording apparatus 100. First, the overall configuration of the recording apparatus 100 is described with reference to FIG. 1.

As shown in FIG. 1, the recording apparatus 100 includes a medium transport section 20, a medium adhesion section 60, a belt supporting section 91, a printing section 40, a heating unit 27, and a washing unit 50. In the recording apparatus 100, at least one of the medium adhesion section 60 and the belt supporting section 91 corresponds to a heating section that heats an endless belt 23. Further, a control section 1 that controls each of the sections is provided. Each of the sections of the recording apparatus 100 is attached to a frame section 90.

The heating section that heats the endless belt may be disposed on the upstream side of the printing section 40 in the transport direction and may be provided at a place different from the medium adhesion section 60 and the belt supporting section 91. For example, the heating section may be disposed on the upstream side of the medium adhesion section 60 in the transport direction. In this configuration, the heating section can dry the endless belt 23 wetted by washing. Also, the heating section may heat the endless belt in a non-contact manner.

The medium transport section 20 transports the fabric 95 in the transport direction. The medium transport section 20 includes a medium supply section 10, transport rollers 21 and 22, the endless belt 23, a belt rotating roller 24, a belt drive roller 25 as a drive roller, transport rollers 26 and 28, and a medium recovery section 30.

Apparatus Configuration Relating to Medium Transport Section

First, the transport path of the fabric 95 from the medium supply section 10 to the medium recovery section 30 is described. In FIG. 1, the direction along the direction of action of gravity is referred to as the "Z-axis direction", the direction of transport of the fabric 95 in the printing section 40 is referred to as the "X-axis direction", the width direction of the fabric 95 crossing both the Z-axis direction and the X-axis direction is referred to as the "Y-axis direction". In addition, the positional relation along the transport direction of the fabric 95 or the moving direction of the endless belt 23 is referred to as the "upstream side" or the "downstream side".

The medium supply section 10 supplies the fabric 95, on which an image is to be formed, to the printing section 40 side. The medium supply section 10 has a supply shaft section 11 and a bearing section 12. The supply shaft section 11 is formed in a cylindrical or prismatic shape and is provided to be rotatable in the circumferential direction. In addition, the strip-shaped fabric 95 is wound in a roll shape on the supply shaft section 11. The supply shaft section 11 is attached detachably to the bearing section 12. This enables the fabric 95 in the state of being previously wound on the supply shaft section 11 to be attached together with the supply shaft section 11 to the bearing section 12.

The bearing section 12 rotatably supports both ends in the axial direction of the supply shaft section 11. The medium supply section 10 has a rotational drive section (not shown) which rotationally drives the supply shaft section 11. The rotational drive section rotates the supply shaft section 11 in the direction in which the fabric 95 is delivered. The operation of the rotational drive section is controlled by the control section 1. The transport rollers 21 and 22 relay the fabric 95 from the medium supply section 10 to the endless belt 23.

The endless belt 23 is held between at least two rollers which rotate the endless belt 23 and transports the fabric 95 in the transport direction (+X-axis direction) while supporting it by rotational movement of the endless belt 23. In detail, the endless belt 23 is a seamless belt formed by seamlessly coupling both ends of a strip-shaped belt, and is laid between the two rollers: the belt rotation roller 24 and the belt drive roller 25.

The endless belt 23 is held in a state where predetermined tension acts so that a portion between the belt rotation roller 24 and the belt drive roller 25 becomes horizontal. The surface (support surface) 23a of the endless belt 23 is coated with an adhesive agent 29 which allows the fabric 95 to adhere. That is, the endless belt 23 has an adhesive layer composed of the adhesive agent 29. The fabric 95 is adhered to the endless belt 23 through the adhesive agent 29. The endless belt 23 supports (holds) the fabric 95 supplied from the transport roller 22 and adhered to the adhesive agent 29 in the medium adhesion section 60. Thus, even the stretchable fabric can be stably supported.

The adhesiveness of the adhesive 29 is preferably increased by heating. When the adhesive 29 whose adhesiveness is increased by heating is used, the fabric 95 can be satisfactorily adhered to the adhesive layer. Usable examples of the adhesive 29 include a hot-melt adhesive containing thermoplastic elastomer SIS as a main component and the like. Examples of the adhesive 29 include "Polixresin", "Newdyne", and "Aquadyne" series manufactured by Yokohama Polymer Kenkyusho K. K., "MC Polymer Series" manufactured by Murayama Chemical Laboratory Co., Ltd., "Unikensol RV-30 (for screen printing)" manufactured by Union Chemical Ind. Co., Ltd., "Plaster EH" manufactured by Shin-Nakamura Chemical Co., Ltd., "ATRASOL GP1 (ATR code ATR1717)" manufactured by Atr Chemicals Company, and the like.

The belt drive roller 24 and the belt drive roller 25 support the inner surface 23b of the endless belt 23. In order to support the endless belt 23, a contact section 69, a belt support section 91, and a platen 46 are provided between the belt drive roller 24 and the belt drive roll 25. The contact section 69 is provided in a region facing a pressure section 61 described later through the endless belt 23, the platen 46 is provided in a region facing the printing section 40 through the endless belt 23, and the belt support section 91 is provided between the contact section 69 and the platen 46. The endless belt 23 is supported by the contact section 69, the belt support section 91, and the platen 46, and thus vibration or the like of the endless belt 23 with the movement of the endless belt 23 can be suppressed.

The belt drive roller 25 is a drive section that transports the fabric 95 in the transport direction by rotating the endless belt 23, and thus a motor (not shown) is provided for rotationally driving the belt drive roller 25. The belt drive roller 25 is provided on the downstream side of the printing section 40 in the transport direction of the fabric 95, and the belt driver roller 24 is provided on the upstream side of the printing section 40. When the belt drive roller 25 is rotationally driven, the endless belt 23 is rotated with the rotation of the belt drive roller 25, and the belt drive roller 24 is rotated by the rotation of the endless belt 23. The fabric 95 supported by the endless belt 23 is transported in the transport direction (+X-axis direction) by the rotation of the endless belt 23, and an image is formed on the fabric 95 in the printing section 40 described later.

In the example shown in FIG. 1, the fabric 95 is supported on the side (+Z-axis side) where the surface 23a of the endless belt 23 faces the printing section 40, and the fabric 95 is transported together with the endless belt 23 from the belt drive roll 24 side to the belt drive roller 25 side. On the side (−Z-axis side) where the surface 23a of the endless belt 23 faces the washing unit 50, only the endless belt 23 is moved from the belt drive roller 25 side to the belt drive roller 24 side.

The transport roller 26 separates the fabric 95, on which the image has been formed, from the adhesive 29 of the endless belt 23. The transport rollers 26 and 28 relay the fabric 95 from the endless belt 23 to the medium recovery section 30.

The medium recovery section 30 recovers the fabric 95 transported by the medium transport section 20. The medium recovery section 30 has a winding shaft section 31 and a bearing section 32. The winding shaft section 31 is formed in a cylindrical or prismatic shape and is rotatably provided in the circumferential direction. The strip-shaped fabric 95 is wound in a roll shape on the winding shaft section 31. The winding shaft section 31 is provided detachably on the bearing section 32. Thus, the fabric 95 in a state of being wound on the winding shaft section 31 can be removed together with the winding shaft section 31.

The bearing section 32 rotatably supports both ends of the winding shaft section 31 in the axial direction thereof. The medium recovery section 30 has a rotational drive section (not shown) which rotationally drives the winding shaft section 31. The rotational drive section rotates the winding shaft section 31 in the winding direction of the fabric 95. The operation of the rotational drive section is controlled by the control section 1.

Next described are the heating section, the printing section 40, the heating unit 27, and the washing unit 50, which are provided along the medium transport section 20.

Apparatus Configuration Relating to Heating Section

A heater which heats the endless belt 23 is provided on at least one of the contact section 69 and the belt support section 91. The heater constitutes the heating section. When the heater is provided in the contact section 69, pressure and heat can be applied to the endless belt 23 by the pressure section 61, and thus adhesion of the fabric 95 to the endless belt 23 can be preferably improved. Therefore, when the heater is provided in any one of the contact section 69 and the belt support section 91, the heater is more preferably provided on the contact section 69.

The heating section softens the adhesive layer by heating and causes the adhesive layer to exhibit adhesiveness, thereby improving adhesion between the fabric 95 and the adhesive layer. This can suppress the movement of the fabric 95 on the endless belt 23, and thus good transport precision can be obtained.

When the endless belt 23 is heated by the heater provided in at least one of the contact section 69 and the belt support section 91, the temperature of the surface 23a of the endless belt 23 is preferably 80° C. or less, more preferably 70° C. or less, and still more preferably 60° C. or less. When the temperature of the surface 23a of the endless belt 23 is within the range described above, the resin particles contained in an ink jet ink composition described later has suppressed reactivity, and thus the belt may be more easily washed. The lower limit of the temperature of the surface 23a of the endless belt 23 may be a temperature which exhibits the adhesiveness of the adhesive layer, and is preferably 30° C. or more, more preferably 35° C. or more, and still more preferably 40° C. or more. The temperature of the surface 23a of the endless belt 23 can be measured by, for example, a radiation-type thermometer, a contact-type thermometer, or the like, and the temperature is more preferably measured by a radiation-type thermometer.

When the heater is provided on at least one of the contact section 69 and the belt support section 91, a temperature detection section (not shown) may be provided for detecting the surface temperature of the endless belt 23. For example, a thermocouple or the like can be used as the temperature detection section. Thus, the control section 1 can control the heater based on the temperature detected by the temperature detection section so as to adjust the endless belt 23 to a predetermined temperature. A non-contact type thermometer using infrared light may be used for the temperature detection section.

Apparatus Configuration Relating to Printing Section

The printing section 40 is disposed above (+Z-axis side) the arrangement position of the endless belt 23 and performs printing on the fabric 95 mounted on the surface 23a of the endless belt 23. The printing section 40 includes a head unit 42, a carriage 43 loaded with the head unit 42, and a carriage movement section 45 which moves the carriage 43 in the width direction (Y-axis direction) of the fabric 95 crossing the transport direction. The head unit 42 is provided with plural ink jet recording heads (not shown) which ejects, as droplets, the ink jet ink composition described later supplied from an ink supply section (not shown) to the fabric 95 mounted on the endless belt 23.

The carriage movement section 45 is provided above (+Z-axis side) the endless belt 23. The carriage movement section 45 has a pair of guide rails 45a and 45b extending along the Y-axis direction. The head unit 42 is supported together with the carriage 43 by the guide rails 45a and 45b in a state of being reciprocable in the Y-axis direction.

The carriage movement section 45 is provided with a movement mechanism and power source (not shown). For example, a mechanism including a combination of a ball screw and a ball nut, a linear guide mechanism, or the like can be used as the movement mechanism. Further, the carriage movement section 45 has a motor (not shown) as a power source for moving the carriage 43 along the guide rails 45a and 45b. Usable examples of the motor include various motors such as a stepping motor, a servo motor, a linear motor, and the like. When the motor is driven by control by the control section 1, the head unit 42 is moved together with the carriage 43 along the Y-axis direction.

Apparatus Configuration Relating to Heating Unit

The heating unit 27 is provided between the transport roller 26 and the transport roller 28. The heating unit 27 heats the ink jet ink composition ejected on the fabric 95. Thus, the reaction of resin particles of the ink jet ink composition can be allowed to sufficiently proceed. The sufficient reaction of the resin particles has a tendency that an image with good friction fastness can be formed. The heating unit 27 may be also used for the purpose of drying the fabric 95. The heating unit 27 includes, for example, an IR heater, and the ink jet ink composition ejected on the fabric 95 can be reacted within a short time by driving the IR heater. Thus, the strip-shaped fabric 95, on which an image has been formed, can be wound on the winding shaft section 31.

Apparatus Configuration Relating to Washing Unit

The washing unit 50 is disposed between the belt drive roller 24 and the belt drive roller 25 in the X-axis direction. The washing unit 50 has a washing section 51, a pressure section 52, and a movement section 53. The movement section 53 integrally moves the washing unit 50 along a floor surface 99 and fixes it at a predetermined position.

The pressure section 52 is an elevating device configured by an air cylinder 56 and a ball bush 57 and brings the washing section 51, provided thereon, into contact with the surface 23*a* of the endless belt 23. The washing section 51 is laid in a state where tension acts between the belt drive roller 24 and the belt drive roller 25, and the surface 23*a* (support surface) of the endless belt 23 moved from the belt drive roll 25 to the belt drive roller 24 is washed from below (−Z-axis direction).

The washing section 51 has a washing tank 54, a washing roller 58, and a blade 55. The washing tank 54 is a tank which stores a washing liquid used for washing an ink and foreign materials adhered to the surface 23*a* of the endless belt 23, and the washing roller 58 and the blade 55 are provided inside the washing tank 54. For example, water or a water-soluble solvent (an aqueous alcohol solution or the like) can be used as the washing liquid, and if required, a surfactant and a defoaming agent may be added.

When the washing roller 58 is rotated, the washing liquid is supplied to the surface 23*a* of the endless belt 23, and the washing roller 58 slides on the endless belt 23. Thus, the ink jet ink composition and fibers of the fabric 95 adhered to the endless belt 23 are removed by the washing roller 58.

The blade 55 can be formed by, for example, a flexible material such as silicon rubber or the like. The blade 55 is provided on the downstream side of the washing roller 58 in the transport direction of the endless belt 23. When the blade 55 slides on the endless belt 23, the washing liquid remaining on the surface 23*a* of the endless belt 23 is removed.

Electrical Configuration

Figure 2:
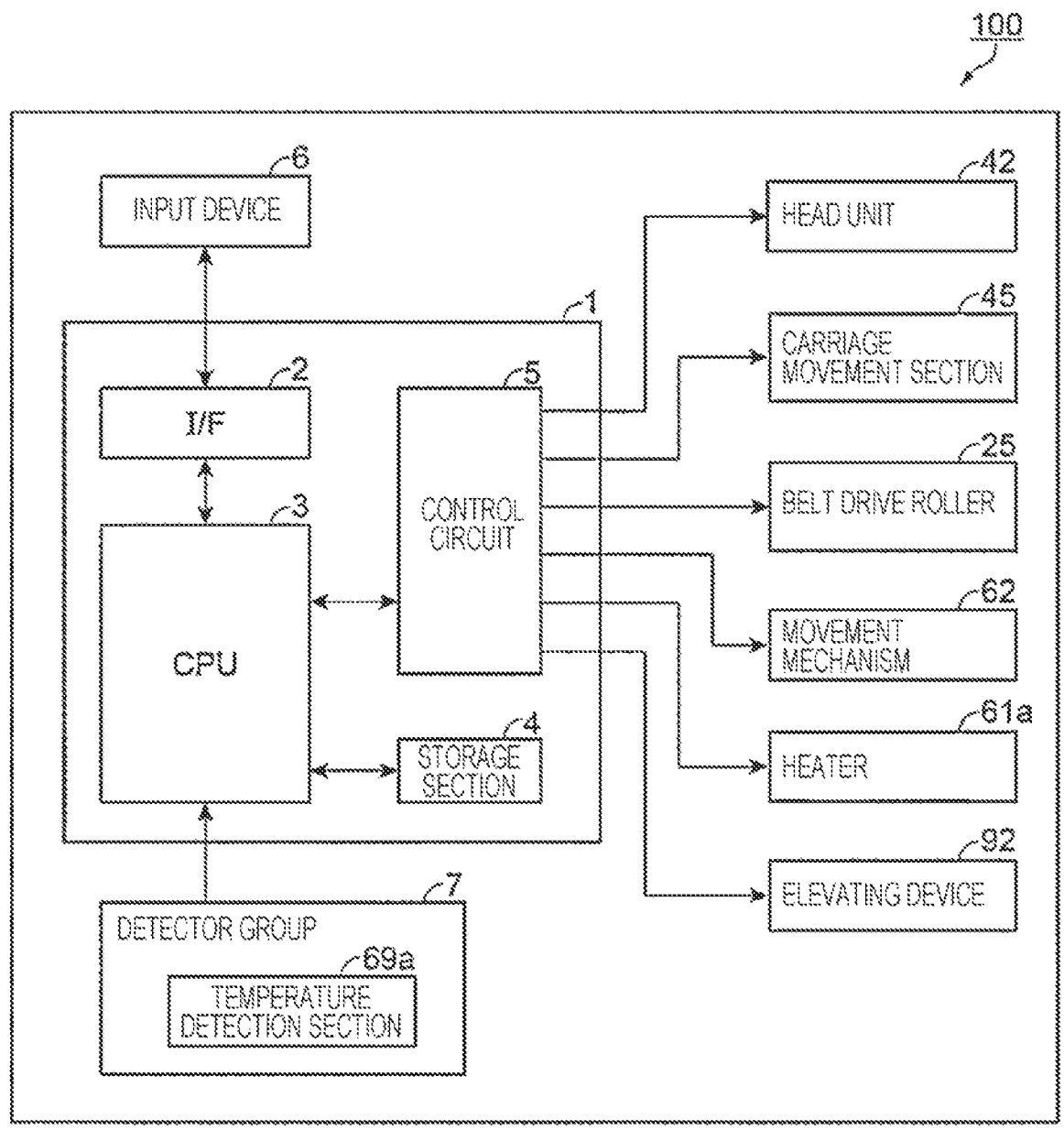
FIG. 2 is an electrical block diagram showing the electrical configuration of a recording apparatus.

Next, the electrical configuration of the recording apparatus 100 is described with reference to FIG. 2. FIG. 2 is an electrical block diagram showing the electrical configuration of the recording apparatus 100.

The recording apparatus 100 includes an input device 6 to which printing conditions etc. are input, and the control section 1 which controls each of the sections of the recording apparatus 100. A disk top-type or lap top-type personal computer (PC), a tablet-type terminal, a portable-type terminal, and the like can be used as the input device 6. The input device 6 may be provided as a separate body from the recording apparatus 100.

The control section 1 includes an interface section (I/F) 2, CPU (Central Processing Unit) 3, a storage section 4, a control circuit 5 etc. The interface section 2 is a receiving section which receives information such as the printing conditions, the type of the fabric, and the like, which are input to the input device 6. The interface section 2 sends and receives data between the input device 6, which handles input signals and images, and the control section 1. The CPU 3 is an arithmetic processing unit which processes input signals from various detector groups 7 including the temperature detection section, and controls the printing operation of the recording apparatus 100. The storage section 4 is a storage medium in which a region storing a program of the CPU 3 and a working region are secured, and has memory elements such as RAM (Random Access Memory), EEPROM (Electrically Erasable Programmable Read Only Memory), and the like.

The control section 1 controls the drive of the ink jet recording head provided in the head unit 42 by using the control signal output from the control circuit 5 to eject an ink to the fabric 95. The control section 1 controls the drive of the motor provided in the carriage movement section 45 by using the control signal output from the control circuit 5 to reciprocate the carriage 43, loaded with the head unit 42, in the scanning direction (Y-axis direction). The control section 1 controls the drive of the motor provided in the belt drive roller 25 by using the control signal output from the control circuit 5 to rotationally move the endless belt 23. Consequently, the fabric 95 mounted on the endless belt 23 is moved in the transport direction (+X-axis direction).

Based on the temperatures detected by the temperature detection section (not shown) provided in the contact section 69, the belt support section 91, etc., the control section 1 controls the voltage added to each of the heaters and controls the amount of heat generated in each heater by using the control signal output from the control circuit 5. Also, the control section 1 controls various devices (not shown) by using the control signal output from the control circuit 5.

1.1.2. Fabric

The fabric used in the ink jet textile printing method according to the embodiment of the disclosure is a fabric composed of hydrophobic fibers and is treated with a cationic polymer.

1.1.2.1. Fabric Composed of Hydrophobic Fibers

The fabric used in the ink jet textile printing method according to the embodiment of the disclosure is a fabric composed of hydrophobic fibers. The "hydrophobic fibers" represents fibers not having a hydrophilic group, such as a OH group or the like, and having low water absorption/low moisture absorption. Examples of the hydrophobic fibers include polyester, nylon, acryl, polyurethane, and a blend of two or more of these, and the like. Also, blended fibers containing 80% or more of the hydrophobic fibers may be used.

Among fabrics composed of the hydrophobic fibers, a fabric composed of polyester and having a METSUKE of 40 to 180 $g/m^2$ is more preferred from the viewpoint that the more effect of the present disclosure can be obtained. That is, a fabric composed of polyester and having a METSUKE of 40 to 180 $g/m^2$ is thin and lightweight, and an ink particularly easily permeates through the fabric, and thus belt contamination significantly occurs. However, even with such a fabric, the ink jet textile printing method according to the embodiment of the disclosure can decrease belt contamination. The "METSUKE" represents the mass per unit area of a woven fabric or a knit. The METSUKE of the fabric is more preferably 60 to 150 $g/m^2$, still more preferably 75 to 125 g/m$^2$, and particularly preferably 90 to 105 g/m$^2$. When the fabric is composed of polyester and has a METSUKE within the range described above, there is a tendency that belt contamination can be decreased, and excellent color development can be obtained.

The fabric composed of polyester and having a METSUKE of 40 to 180 g/m$^2$ is not particularly limited, and examples thereof include the following materials. The examples include materials for so-called soft sign applications, such as a banner, a flag, a tapestry, and the like, for example, polyester tropical (thickness; about 0.2 mm, METSUKE: 96 to 158 g/m$^2$), polyester pongee (thickness; about 0.14 mm, METSUKE: 58 g/m$^2$), twill (thickness; about 0.28 mm, METSUKE: 119 g/m$^2$), polyester mat (thickness; about 0.31 mm, METSUKE: 160 g/m$^2$), polyester suede (thickness; about 0.26 mm, METSUKE: 104 g/m$^2$), polyester satin (thickness; about 0.21 mm, METSUKE: 153 g/m$^2$), and the like. With the fabric having a thickness 0.1 to 0.4 mm, METSUKE is easily adjusted within a range of 40 to 180 g/m$^2$, but the thickness is not particularly limited.

Examples of commercial products of the fabric composed of polyester and having a METSUKE of 40 to 180 g/m$^2$ include Polyester Tropical (manufactured by Toray Industries, Inc., METSUKE: 120 g/m$^2$), Polyester Tropical (manufactured by Teijin Limited, METSUKE: 158 g/m$^2$), and the like.

1.1.2.2. Cationic Polymer Treatment

The fabric used in the ink jet textile printing method according to the embodiment of the disclosure is treated with the cationic polymer.

The cationic polymer preferably has, in its structure, any one cationic functional group selected from the group consisting of a primary amino group, a secondary amino group, a tertiary amino group, a quaternary ammonium base, an imino group, and an amide group, and particularly preferably has a quaternary ammonium base as the cationic functional group. Such a cationic polymer tends to have more excellent color development. The cationic polymer may have two or more of the cationic functional groups.

Examples of the cationic polymer having a primary amino group include polyallyamine, polyallylamine hydrochloride salts, polyallylamineamide sulfate salts, methoxycarbonylated allylamine polymer, methylcarbonylated allylamine acetate salt polymer, urea-polyallylamine polymer, carboxymethylated polyallylamine polymer, hexamethylenediamine/epichlorohydrin resin, and the like.

A commercial product of the cationic polymer having a primary amino group can also be used, and examples thereof include PAA-01, PAA-03, PAA-05, PAA-08, PAA-15C, PAA-25; PAA-HCL-01, PAA-HCL-03, PAA-HCL-05, PAA-HCL-3L, PAA-HCL-10L; PAA-SA; PAA-U5000, PAA-U7030; PAA-AC5050A; PAA-N5000, PAA-N5050CL; and PAA-CB-1 (manufactured by Nittobo Medical Co., Ltd.); Unisense KHE103L (manufactured by Senka Corporation); and the like.

Examples of the cationic polymer having a secondary amino group include a diallylamine polymer, a diallylamine hydrochloride salt polymer, diallylamine hydrochloride salt-sulfur dioxide copolymer, diallylamine acetate salt-sulfur dioxide copolymer, diallylamine hydrochloride salt-acrylamide copolymer, dimethylamine/epichlorohydrin resin, dimethylamine/ammonia/epichlorohydrin resin, dimethylamine-ethylenediamine-epichlorohydrin polymer, and the like.

A commercial product of the cationic polymer having a secondary amino group can also be used, and examples thereof include PAS-21; PAS-21CL; PAS-92; PAS-92A; and PAS-2141CL (manufactured by Nittobo Medical Co., Ltd.), Unisense KHE104L; and Unisense KHE100L (manufactured by Senka Corporation), Cation Master PE-30 (manufactured by Yokkaichi Chemical Co., Ltd.), and the like.

Examples of the cationic polymer having a tertiary amino group include dimethyldiallylamine hydrochloride salt polymer, methyldiallylamineamide sulfate salt polymer, methyldiallylamine acetate salt polymer, methyldiallylamine hydrochloride salt-sulfur dioxide copolymer, dicyandiamide-polyalkylene polyamine polycondensate, and the like.

A commercial product of the cationic polymer having a tertiary amino group can also be used, and examples thereof include PAS-M-1L, PAS-M-1; PAS-22SA-40; PAS-M-1A; and PAS-2201CL (manufactured by Nittobo Medical Co., Ltd.), Unisense KHP10L (manufactured by Senka Corporation), and the like.

Examples of a commercial product of the cationic polymer having a primary amino group, a secondary amino group, or a tertiary amino group include Suparamil C-305 (manufactured by Toho Chemical Industry Co., Ltd.), Arafix 255 and 251S (manufactured by Arakawa Chemical Industries, Ltd.), Jetfix 38A, 220, 260, N700, and 90X (manufactured by Satoda Chemical Industrial Co., Ltd.), WS4020, WS4030, WS4027, PA6646, and DK6854 (manufactured by Seiko PMC Corporation), and the like.

Examples of the cationic polymer having a quaternary ammonium base include diallyldimethyl ammonium chloride polymer, diallylmethylethyl ammonium ethyl sulfate polymer, diallylmethylethyl ammonium ethyl sulfate/sulfur dioxide copolymer, diallyldimethyl ammonium chloride/sulfur dioxide copolymer, diallyldimethyl ammonium chloride/acrylamide copolymer, and the like.

A commercial product of the cationic polymer having a quaternary ammonium base can also be used, and examples thereof include PAS-H-1L, PAS-H-5L, PAS-H-10L; PAS-24; PAS-2401; PAS-A-1, PAS-A-5; PAS-J-81L, PAS-J-81, and PAS-J-41 (manufactured by Nittobo Medical Co., Ltd.), EP-1137 (manufactured by Takamatsu Oil & Fat Co., Ltd.), Papiogen P-105 and Milliogen P-20 (manufactured by Senka Corporation), and the like.

Examples of the cationic polymer having an imido group include polyethyleneimine, octadecyl isocyanate-modified polyethyleneimine, propylene oxide-modified polyethyleneimide, and the like.

A commercial product of the cationic polymer having an imido group can also be used, and examples thereof include SP-003, SP-006, SP-012, SP-018, SP-200, HM-2000, P-1000, P-3000; RP-20; and PP-061 (manufactured by Nippon Shokubai Co., Ltd.), Lupasol (manufactured by BASF Corporation), and the like.

Examples of the cationic polymer having an amide group include polyamide, a polyamide epoxy resin, and the like. Examples of a commercial product of the cationic polymer having an amide group include Sumirez Resin 633, 630(30), 675A, 6615, 6725, and SLX-1 (manufactured by Taoka Chemical Co., Ltd.), and the like.

Examples of the cationic polymer having two or more cationic functional groups include the following.

Examples of the cationic polymer having a primary amino group and a secondary amino group include allylamine-diallylamine copolymer, allylamine acetate salt-diallylamine acetate salt copolymer, and the like. Examples of a commercial product thereof include PAA-D11 and PAA-D19A (manufactured by Nittobo Medical Co., Ltd.), and the like.

Examples of the cationic polymer having a primary amino group and a quaternary ammonium base include allylamine/ diallyldimethylammonium chloride copolymer and the like. Examples of a commercial product thereof include PAA-1123 (manufactured by Nittobo Medical Co., Ltd.) and the like.

Examples of the cationic polymer having a tertiary amino group and a quaternary ammonium base include methyldiallylamine/diallyldimethylammonium chloride copolymer, diallyldimethylammonium chloride/3-chloro-2-hydroxypylated diallylamine hydrochloride salt copolymer, and the like. Examples of a commercial product thereof include PAA-2223 and PAS-880 (manufactured by Nittobo Medical Co., Ltd.), and the like.

Among these cationic polymers, a polyallylamineamide sulfate salt (trade name "PAA-SA" manufactured by Nittobo Medical Co., Ltd.) and diallyldimethylammonium chloride polymer (trade name "PAS-H-10L" manufactured by Nittobo Medical Co., Ltd.) can be preferably used, and diallyldimethylammonium chloride polymer is particularly preferred. These cationic polymers tend to more decrease belt contamination and more improve color development.

The cationic polymers may be used alone or in combination of two or more.

The molecular weight as weight-average molecular weight of the cationic polymer is preferably 1,500 to 250,000, more preferably 5,000 to 230,000, and still more preferably 10,000 to 210,000. The cationic polymer having a molecular weight within the range described above can more decrease belt contamination and can sometimes more improve color development. In the present specification, the "weight-average molecular weight" represents a weight-average molecular weight in terms of standard polystyrene molecular weight, and is measured by using GPC (HLC-8220 [trade name], manufactured by Tosoh Corporation) and three columns in series: TSK-gel Super HZM-M (exclusion limit molecular weight: $4 \times 10^6$, molecular weight fraction range: 266 to $4 \times 10^6$, number of theoretical stages: 16,000 stages/column, filler material: styrene copolymer, filler particle diameter: 3 μm).

The amount of cationic polymer adhered relative to 100% by mass of fabric weight is preferably 0.4% to 5% by mass, more preferably 0.5% to 4% by mass, still more preferably 0.6% to 3% by mass, particularly preferably 0.7% to 2% by mass, and even still more preferably 0.8% to 1.5% by mass. When the amount of cationic polymer adhered is within the range described above, there is a tendency that satisfactory color development and trike through (color development on the fabric back side) can be secured, friction fastness can be improved, and the cost of cationic polymer treatment can be decreased.

Pretreatment Solution

The cationic polymer is preferably used by being contained in a liquid as a pretreatment solution in view of enabling easy treatment of the fabric. Described below are the components which can be contained in the pretreatment solution in preparing the pretreatment solution.

Cationic Polymer

In preparing the pretreatment solution, the pretreatment solution contains the cationic polymer described above. The cationic polymer is as described above, and thus description is omitted. The content of the cationic polymer in the pretreatment solution is preferably 0.5% to 30% by mass relative to 100% by mass of the pretreatment solution. When the pretreatment solution is adhered by a dipping method, the content is more preferably 0.6% to 3% by mass and still more preferably 0.7% to 2% by mass. When the pretreatment solution is adhered by ink jet coating or spray coating, a higher content is preferred and, for example, the content may be 3% to 30% by mass.

Water

In preparing the pretreatment solution, the pretreatment solution preferably contains water, and the pretreatment solution is preferably an aqueous pretreatment solution. The aqueous system represents a composition containing water as a main solvent component. The water may be contained as a main solvent component which is a component evaporated and scattered by drying. The water is preferably pure water such as ion exchange water, ultrafiltered water, reverse osmosis water, or the like, or water such as ultrapure water, from which ionic impurities are removed as much as possible. In addition, water sterilized by ultraviolet irradiation or addition of hydrogen peroxide is preferably used because when the pretreatment solution is stored for a long period, the occurrence of molds and bacteria can be suppressed. The content of water relative to the total amount of the pretreatment solution is preferably 45% by mass or more, more preferably 50% by mass or more and 98% by mass or less, and still more preferably 55% by mass or more and 95% by mass or less.

Preservative

In preparing the pretreatment solution, the pretreatment solution may contain a preservative. Examples of the preservative include Proxel CRL, Proxel BDN, Proxel GXL, Proxel XL-2, Proxel IB, and Proxel TN (all manufactured by Lonza Ltd.), and the like. The content of the preservative relative to the total amount of the pretreatment solution is preferably 0.1% by mass or more and 0.5% by mass or less and more preferably 0.1% by mass or more and 0.3% by mass or less.

Other Component

In preparing the pretreatment solution, the pretreatment solution may contain an organic solvent, an emulsifier, resin particles, a surfactant, an antirust agent, a chelating agent, a viscosity modifier, an antioxidant, and additives such as ureas/amines/saccharides, and the like.

Examples of a method for treating the fabric with the cationic polymer include, but are not particularly limited to, a treatment method of coating by dipping the fabric in the pretreatment solution containing the cationic polymer, a treatment method of coating the fabric by impregnating a roller or the like with the pretreatment solution containing the cationic polymer, a treatment method of coating by spraying the pretreatment solution containing the cationic polymer to the fabric, a treatment method of coating the fabric by ejecting the pretreatment solution containing the cationic polymer from an ink jet recording head, and the like. The method of treating the fabric with the cationic polymer by an ink jet method can be performed by using the recording apparatus 100 shown in FIG. 1 and FIG. 2 described above. Further, treatment of the fabric with the cationic polymer may be included in the ink jet textile printing method according to the embodiment of the disclosure. In this case, the treatment may be performed before ink adhesion described later.

1.2. Ink Adhesion

The ink jet textile printing method according embodiment includes adhering (ink adhesion) an ink containing a pigment, resin particles, and water by an ink jet method.

The use of the recording apparatus 100 shown in FIG. 1 and FIG. 2 enables the ink (ink jet ink composition) to be easily adhered to the fabric by the ink jet method. Specifically, the ink jet ink composition described later is ejected and adhered to the fabric 95 mounted on the endless belt 23 from the ink jet recording head provided in the recording apparatus 100. The ink jet method may be any system, and examples thereof include a charge deflection system, a continuous system, an on-demand system (piezo system, bubble shot (registered trade mark) system), and the like. Among these ink jet methods, a system using a piezo-type ink jet recording apparatus is particularly preferred.

1.2.1. Ink Jet Ink Composition

The ink (ink jet ink composition) used in the ink jet textile printing method according to the embodiment of the present disclosure contains a pigment, resin particles, and water. The components contained in the ink jet ink composition are described below.

1.2.1.1. Pigment

The ink jet ink composition used in the ink jet textile printing method according to the embodiment of the present disclosure contains the pigment. Examples of the pigment type include, but are not particularly limited to, inorganic pigments such as carbon black, calcium carbonate, titanium oxide, and the like; organic pigments such as an azo pigment, an isoindolinone pigment a diketopyrrolopyrrole pigment, a phthalocyanine pigment, a quinacridone pigment, an anthraquinone pigment, and the like; and the like.

Examples of a black pigment include No. 2300, No. 900, MCF88, No. 33, No. 40, No. 45, No. 52, MA7, MA8, MA100, No. 2200B, and the like (the above manufactured by Mitsubishi Chemical Corporation), Raven 5750, Raven 5250, Raven 5000, Raven 3500, Raven 1255, Raven 700, and the like (the above manufactured by Colombia Carbon Co., Ltd.), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (the above manufactured by Cabot Corporation), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (the above manufactured by Degussa Ltd.), and the like.

Examples of a white pigment include C. I. Pigment White 1 (basic lead carbonate), 4 (zinc oxide), 5 (mixture or zinc sulfide and barium sulfate), 6 (titanium oxide), 6:1 (titanium oxide containing other metal oxides), 7 (zinc sulfide), 18 (calcium carbonate), 19 (clay), 20 (mica titanium), 21 (barium sulfate), 22 (natural barium sulfate), 23 (gross white), 24 (alumina white), 25 (gypsum), 26 (magnesium oxide/silicon oxide), 27 (silica), and 28 (anhydrous calcium silicate), and the like.

Examples of a yellow pigment include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180, and the like.

Examples of a magenta pigment include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48, 57, 57:1, 88, 112, 114, 122, 123, 144, 146, 149, 150, 166, 168, 170, 171, 175, 176, 177, 178, 179, 184, 185, 187, 202, 209, 219, 224, and 245, C. I. Pigment Violet 19, 23, 32, 33, 36, 38, 43, and 50, and the like.

Examples of a cyan pigment include C. I. Pigment Blue 1, 2, 3, 15, 15:1, 15:2, 15:3, 15:34, 15:4, 16, 18, 22, 25, 60, 65, and 66, C. I. Vat Blue 4 and 60, and the like.

Examples of pigments other than black, white, yellow, magenta, and cyan include C. I. Pigment Green 7 and 10, C. I. Pigment Brown 3, 5, 25, and 26, C. I. Pigment Orange 1, 2, 5, 7, 13, 14, 15, 16, 24, 34, 36, 38, 40, 43, and 63, and the like.

The pigments may be used alone or in combination of two or more.

The pigment may be used by being dispersed using a dispersant selected from a water-soluble resin, a water-dispersible resin, a surfactant, and the like, or by being dispersed as a self-dispersed pigment through surface oxidation or sulfonylation of the pigment with ozone, hypochlorous acid, fuming hydrochloric acid, or the like.

When the pigment is dispersed with a dispersion resin in the ink jet ink composition according to the embodiment of the present disclosure, the ratio of the pigment to the dispersion resin is preferably 10:1 to 1:10 and more preferably 4:1 to 1:3. With respect to the volume-average particle diameter of the pigment during dispersion, the maximum particle diameter measured by a dynamic light scattering method is less than 500 nm, and the average particle diameter is 300 nm or less. The average particle diameter is more preferably 200 nm or less.

1.2.1.2. Resin Particles

The ink jet ink composition used in the ink jet textile printing method according to the embodiment of the disclosure contains the resin particles.

Examples of the resin particles include resin particles composed of a urethane-based resin, an acrylic resin, a fluorene-based resin, a polyolefin-based resin, a rosin-based resin, a terpene-based resin, a polyester-based resin, a polyamide-based resin, an epoxy-based resin, a vinyl chloride-based resin, a vinyl chloride-vinyl acetate copolymer, ethylene-vinyl acetate-based resin, and the like. These resin particles are often handled in an emulsion form, but may be in a powder form. In addition, these types of resin particles may be used alone or in combination of two or more.

The urethane-based resin is a generic name of resins having a urethane bond. Resins which may be used as the urethane-based resin include a polyether-type urethane resin having, in its main chain, an ether bond other than a urethane bond; a polyester-type urethane resin having, in its main chain, an ester bond other than a urethane bond, a polycarbonate-type urethane resin having, in its main chain, a carbonate bond other than a urethane bond; and the like. A commercial product may be used as the urethane-based resin and, for example, may be selected from Superflex 460, 460s, 840, and E-4000 (trade name, manufactured by DKS Co., Ltd.), Resamine D-1060, D-2020, D-4080, D-4200, D-6300, and D-6455 (trade name, Dainichi Chemical Manufactory Co., Ltd.), Takelac WS-6021 and W-512-A-6 (trade name, manufactured by Mitsui Chemicals Polyurethane Co., Ltd.), Sancure 2710 (trade name, manufactured by LUBRIZOL Corporation), Permarin UA-150 (trade name, manufactured by Sanyo Chemical Industries, Ltd.) and the like.

The acrylic resin is a generic name of polymers produced by polymerizing at least an acrylic monomer, such as (meth)acrylic acid, (meth)acrylate ester, or the like, as one component, and examples thereof include a resin produced from an acrylic monomer, a copolymer of an acrylic monomer and another monomer, and the like. For example, an acrylic-vinyl-based resin, which is a copolymer of an acrylic monomer and a vinyl-based monomer, can be used. Further, for example, a copolymer with a vinyl-based monomer such as styrene or the like can be used.

Also, acrylamide, acrylonitrile, and the like can be used as the acrylic monomer. A commercial product of a resin emulsion prepared by using an acrylic resin as a raw material may be used, and for example, may be selected from FK-854

(trade name, manufactured by Chuo Rika Kogyo Corporation), Movinyl 952B and 718A (trade name, manufactured by Nippon Synthetic Chemical Industry Co., Ltd.), Nipol LX852 and LX874 (trade name, manufactured by Zeon Corporation), and the like.

In the present specification, as described above, the acrylic resin may be a styrene-acrylic resin. In the present specification, the description "(meth)acryl" represents at least one of "acryl" and "methacryl".

The styrene-acrylic resin is a copolymer produced from a styrene monomer and an acrylic monomer, and examples thereof include styrene-acrylic acid copolymer, styrene-methacrylic acid copolymer, styrene-methacrylic acid-acrylate ester copolymer, styrene-α-methylstyrene-acrylic acid copolymer, styrene-α-methylstyrene-acrylic acid-acrylate ester copolymer, and the like. A commercial product may be used as the styrene-acrylic resin and, for example, may be selected from Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade name, manufactured by BASF Corporation), Movinyl 966A and 975N (trade name, manufactured by Nippon Synthetic Chemical Industry Co., Ltd.), Vinyblan 2586 (manufactured by Nissin Chemical Industry Co., Ltd.), and the like.

The polyolefin-based resin has, in its structural skeleton, an olefin such as ethylene, propylene, butylene, or the like, and a known resin can be properly selected and used. A commercial product can be used as an olefin resin, and, for example, may be selected from Arrowbase CB-1200 and CD-1200 (trade name, manufactured by Unitika Ltd.), and the like.

The resin particles may be supplied in an emulsion form, and a commercial product of the resin emulsion may be selected from examples below and used. The examples include Microgel E-1002 and E-5002 (trade name manufactured by Nippon Paint Co., Ltd., styrene-acrylic resin emulsion), Bonkote 4001 (trade name, manufactured by DIC Corporation, acrylic resin emulsion), Bonkote 5454 (trade name manufactured by DIC Corporation, styrene-acrylic resin emulsion), Polysol AM-710, AM-920, AM-2300, AP-4735, AT-860, and PSASE-4210E (acrylic resin emulsion), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene-vinyl acetate resin emulsion), Polysol PSASE-6010 (ethylene-vinyl acetate resin emulsion) (trade name manufactured by Showa Denko K. K.), Polysol SAE1014 (trade name, styrene-acrylic resin emulsion, manufactured by Zeon corporation), Saibinol SK-200 (trade name, acrylic resin emulsion manufactured by Saiden Chemical Industry Co., Ltd.), AE-120A (trade name manufactured by JSR Corporation, acrylic resin emulsion), AE373D (trade name manufactured by E-Tech Co., Ltd., carboxy-modified styrene-acrylic resin emulsion), Seikadyne 1900W (trade name manufactured by Dainichiseika Color & Chemicals Mfg. Co., Ltd., ethylene-vinyl acetate resin emulsion),
Vinyblan 2682 (acrylic resin emulsion), Vinyblan 2886 vinyl acetate-acrylic resin emulsion), Vinyblan 5202 (acetic acid-acrylic resin emulsion) (trade name manufactured by Nissin Chemical Industry Co., Ltd.), Elitel KA-5071S, KT-8803, KT-9204, KT-8701, KT-8904, and KT-0507 trade name manufactured by Unitika Ltd., polyester resin emulsion), Hitech SN-2002 (trade name, manufactured by Toho Chemical Industry Co., Ltd., polyester resin emulsion, Takelac W-6020, W-635, W-6061, W-605, W-635, and W-6021 (trade name, manufactured by Mitsui Chemicals Polyurethane Co., Ltd., urethane-based resin emulsion), Superflex 870, 800, 150, 420, 460, 470, 610, and 700 (trade name, manufactured by DKS Co., Ltd. urethane-based resin emulsion), Permarin UA-150 (trade name, manufactured by Sanyo Chemical Industries, Ltd., urethane-based resin emulsion), Sancure 2710 (trade name, manufactured by LUBRIZOL Corporation, urethane-based resin emulsion), NeoRez R-9660, R-9637, and R-940 (manufactured by Kusumoto Chemicals, Ltd., urethane-based resin emulsion), Adekabontiter HUX-380 and 290K (manufactured by Adeka Co., Ltd., urethane-based resin emulsion), Movinyl 966A and Movinyl 7320 (manufactured by Nippon Synthetic Chemical Industry Co., Ltd.), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (the above manufactured by BASF Corporation), NK Binder R-5HN (manufactured by Shin-Nakamura Chemical Co., Ltd.), Hydran WLS-210 (non-crosslinkable polyurethane; manufactured by DIC Corporation), Joncryl 7610 (manufactured by BASF Corporation), and the like.

Among these resin particles, from the viewpoint of enabling improvement in friction fastness of an image, the resin particles composed of a urethane-based resin are preferred, and the resin particles composed of a urethane resin having a crosslinkable group are more preferred.

Urethane Resin Having Crosslinkable Group

Examples of the crosslinkable group in a urethane resin having a crosslinkable group include an isocyanate group and a silanol group, and a chemically protected isocyanate group, that is, a blocked isocyanate group formed by capping or blocking, is preferably used. The blocked isocyanate group is deprotected and activated by heating, thereby forming a bond, for example, a urethane bond, a urea bond, an allophanate bond, or the like. In addition, a urethane resin having a crosslinkable group preferably contains three or more crosslinkable groups in one molecule. In this case, a crosslinked structure is formed by reaction of the crosslinkable groups.

A blocked isocyanate contains a latent isocyanate group formed by blocking an isocyanate group with a blocking agent and can be formed by, for example, reacting a polyisocyanate compound with a blocking agent.

Examples of the polyisocyanate compound include a polyisocyanate monomer, a polyisocyanate derivative, and the like. Examples of the polyisocyanate monomer include polyisocyanates such as aromatic polyisocyanate, aliphatic polyisocyanate, alicyclic polyisocyanate, and the like. These polyisocyanate monomers can be used alone or in combination of two or more.

Examples of the polyisocyanate derivative include multimers of the polyisocyanate monomer, such as a dimer, trimers such as an isocyanurate modified product, an iminooxadiazinedione-modified product, and the like, pentamer, heptamer, and the like; allophanate-modified products such as an allophanate-modified product produced by reacting the polyisocyanate monomer with low-molecular-weight polyol described later, and the like; polyol-modified products such as a polyol-modified product (alcohol adduct) produced by reacting the polyisocyanate monomer with low-molecular-weight polyol described later, and the like; biuret-modified products such as a biuret-modified product produced by reacting the polyisocyanate monomer with water and amines, and the like; urea-modified products such as a urea-modified product produced by reacting the polyisocyanate monomer with diamine, and the like; oxadiazinetrione-modified products such as oxadiazinetrione produced by reacting the polyisocyanate monomer with carbonate gas, and the like; carbodiimide-modified products such as a carbodiimide-modified product produced by decarboxylation condensation reaction of the polyisocyanate monomer, and the like; a uretdione-modified product; a uretonimine-modified product; and the like.

When two or more polyisocyanate compounds are used in combination, two or more polyisocyanate compounds may be simultaneously reacted during production of the blocked isocyanate, or the blocked isocyanates produced by separately using the polyisocyanate compounds may be mixed.

The blocking agent inactivates the isocyanate group by blocking while having the catalyst function of reproducing or activating the isocyanate group after deblocking and also activating the isocyanate group in a state where the isocyanate group is blocked or deblocked.

Examples of the blocking agent include an imidazole-based compound, an imidazoline-based compound, a pyrimidine-based compound, a guanidine-based compound, an alcohol-cased compound, a phenol-based compound, an active methylene-based compound, an amine-based compound, an imine-based compound, an oxime-based compound, a carbamic acid-based compound, a urea-based compound, an acid amide-based (lactam-based) compound, an acid imide-based compound, a triazole-based compound, a pyrazole-based compound, a mercaptan-based compound, bisulfite, and the like.

These blocking agents can be used alone or in combination of two or more. The dissociation temperature of the blocking agent can be properly selected. For example, the dissociation temperature is 60° C. or more and 230° C. or less, preferably 80° C. or more and 200° C. or less, more preferably 100° C. or more and 180° C. or less, and still more preferably 110° C. or more and 160° C. or less. The temperature within the range has an effect of enabling to sufficiently extend the pot life of the ink jet ink composition and also preventing an excessive increase in temperature during heating.

The main chain of the urethane resin having a crosslinkable group may be any one of a polyether type containing an ether bond, a polyester type containing an ester bond, a polycarbonate type containing a carbonate bond, and the like. When the urethane resin having a crosslinkable group is crosslinked to form a crosslinked product, the elongation at break and 100% modulus can be adjusted by changing the density of crosslinking points and the type of the main chain. In particular, the urethane resin particles having a polycarbonate-based skeleton or polyether-based skeleton are more preferred in view of good balance between the elongation at break and 100% modulus and easy improvement in friction fastness of an image and texture of a textile printing product. The polycarbonate-based urethane resin having a polycarbonate-based skeleton is preferred because of the tendency to enable improvement in friction fastness. Also, the pigment is easily adhered to the surface of the fabric, thereby producing a textile printing product having excellent color development and friction fastness.

Examples of a commercial product of the resin particles composed of a urethane resin having a crosslinkable group include Takelac WS-6021 (trade name, manufactured by Mitsui Chemicals & SKC Polyurethanes, Inc., urethane-based resin emulsion, polyether-based polyurethane having a skeleton derived from polyether), WS-5100 (trade name, manufactured by Mitsui Chemicals & SKC Polyurethanes, Inc., urethane-based resin emulsion, polycarbonate-based polyurethane having a skeleton derived from polycarbonate), Elastron E-37 and H-3 (the above is polyester-based polyurethane having a main chain skeleton derived from polyester), Elastron H-38, BAP, C-52, F-29, and W-11P (the above is polyether-based polyurethane having a main chain skeleton derived from polyether) (trade name, manufactured by DKS Co., Ltd., urethane-based resin emulsion), Superflex 870, 800, 150, 420, 460, 470, 610, and 700 (trade name, manufactured by DKS Co., Ltd., urethane-based resin emulsion), Permarin UA-150 (trade name, manufactured by Sanyo Chemical Industries, Ltd., urethane-based resin emulsion), Sancure 2710 (trade name, manufactured by Lubrizol Corporation, urethane-based resin emulsion), NeoRez R-9660, R-9637, and R-940 (trade name, manufactured by Kusumoto Chemicals, Ltd., urethane-based resin emulsion), Adekabontiter HUX-380 and 290K (manufactured by Adeka Co., Ltd., urethane-based resin emulsion), ETERNACALL UW-1501F, UW-1527F, UW-1614AF, and UW-2201AF (trade name, manufactured by Ube Industries, Ltd., urethane-based resin emulsion), and the like.

The glass transition temperature (Tg) of the resin particles is preferably 30° C. or less and more preferably 25° C. or less. When The glass transition temperature (Tg) of the resin particles is within the range described above, there is a tendency to more improve abrasion resistance and dry-cleaning properties and to more improve clogging resistance. The glass transition temperature is measured by, for example, using a differential scanning calorimeter "DSC7000" manufactured by Hitachi High-Tech Science Corporation according to JIS K7121 "Testing methods for transition temperatures of plastics".

The average particle diameter of the resin particles is preferably 20 to 300 nm, and the use of the resin particles having such an average particle diameter can realize the ink jet ink composition having excellent abrasion resistance and dry cleaning properties and excellent ejection stability. The average particle diameter of the resin particles is more preferably 30 to 200 nm. The average particle diameter is a volume-average particle diameter which can be measured by a dynamic light scattering method and can be measured by, for example, using Microtrac UPA 150 (Microtrac Inc.).

The content of the resin particles in terms of solid content relative to 100% by mass of the ink jet ink composition is preferably 1% to 20% by mass, more preferably 1.5% to 15% by mass, still more preferably 2% to 10% by mass, and particularly preferably 2.5% to 7% by mass. The resin particles are preferably contained in a larger amount by mass than a pigment dispersion. When the resin particles are added in a larger amount in mass unit than the pigment dispersion, fixability of the pigment is improved particularly as an ink jet recording ink for textile.

1.2.1.3. Water

The ink jet ink composition used in the ink jet textile printing method according to the embodiment of the disclosure contains water.

The water may be contained as a main solvent component which is a component evaporated and scattered by drying. The water is preferably pure water such as ion exchange water, ultrafiltered water, reverse osmosis water, or the like, or water such as ultrapure water, from which ionic impurities are removed as much as possible. In addition, water sterilized by ultraviolet irradiation or addition of hydrogen peroxide is preferably used because the occurrence of molds and bacteria can be suppressed when the composition is stored for a long period. The content of water relative to the total amount of the ink jet ink composition is preferably 45% by mass or more, more preferably 50% by mass or more and 98% by mass or less, and still more preferably 55% by mass or more and 95% by mass or less.

1.2.1.4. Other Component

The ink jet ink composition used in the ink jet textile printing method according to the embodiment of the disclosure may contain components such as an organic solvent, a surfactant, a pH adjuster, etc.

Organic Solvent

The ink jet ink composition used in the ink jet textile printing method according to the embodiment of the disclosure may contain an organic solvent. By containing the organic solvent, for example, drying properties of a recorded matter may be enhanced, or fastness of an image may be enhanced. Also, the ejection stability of the ink jet ink composition can be improved by containing the organic solvent. The organic solvent is preferably a water-soluble organic solvent.

One of the functions of the organic solvent is to improve wettability of the ink jet ink composition to a fabric and enhance the moisture retention of the ink jet ink composition. Also, the surface tension of the ink jet ink composition can be decreased, and when ejected from the ink jet head, the composition can be easily separated and flied as droplets from nozzles, and wettability to the fabric can be improved, thereby causing excellent spread of ink droplets.

Examples of the organic solvent include esters, alkylene glycol ethers, cyclic esters, nitrogen-containing solvents, polyhydric alcohols, and the like. Examples of nitrogen-containing solvents include cyclic amides, non-cyclic amides, and the like. Examples of non-cyclic amides include alkoxyalkylamides and the like.

Examples of esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, methoxybutyl acetate, and the like; and glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, dipropylene glycol acetate propionate, and the like.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, ε-decanolactone, and the like; and a compound in which hydrogen of a methylene group adjacent to the carbonyl group of each of the above esters is substituted by an alkyl group having 1 to 4 carbon atoms.

Examples of nitrogen-containing solvents include non-cyclic amides, cyclic amides, and the like. Examples of noncyclic amides include alkoxyalkylamides.

Examples of alkoxyalkylamides include 3-methoxy-N,N-dimethyl propionamide, 3-methoxy-N,N-diethyl propionamide, 3-methoxy-N,N-methylethyl propionamide, 3-ethoxy-N,N-dimethyl propionamide, 3-ethoxy-N,N-diethyl propionamide, 3-ethoxy-N,N-methylethyl propionamide, 3-n-butoxy-N,N-dimethyl propionamide, 3-n-butoxy-N,N-diethyl propionamide, 3-n-butoxy-N,N-methylethyl propionamide, 3-n-propoxy-N,N-dimethyl propionamide, 3-n-propoxy-N,N-diethyl propionamide, 3-n-propoxy-N,N-methylethyl propionamide, 3-iso-propoxy-N,N-dimethyl propionamide, 3-iso-propoxy-N,N-diethyl propionamide, 3-iso-propoxy-N,N-methylethyl propionamide, 3-tert-butoxy-N,N-dimethyl propionamide, 3-tert-butoxy-N,N-diethyl propionamide, 3-tert-butoxy-N,N-methylethyl propionamide, and the like.

In addition, alkoxyalkylamides which are compounds represented by general formula (1) below are preferably used as the noncyclic amides.

$$R^1-O-CH_2CH_2-(C=O)-NR^2R^3 \qquad (1)$$

In the formula (1), $R^1$ represents an alkyl group having 1 or more and 4 or less carbon atoms, and $R^2$ and $R^3$ each independently represent a methyl group or an ethyl group. The "alkyl group having 1 or more and 4 or less carbon atoms" may be a straight chain or branched alkyl group, and examples thereof include a methyl group, an ethyl group, a n-propyl group, an iso-propyl group, a n-butyl group, a sec-butyl group, an iso-butyl group, and a tert-butyl group. The compounds represented by the general formula (1) may be used alone or in combination of two or more.

The cyclic amides are, for example, lactams, and examples thereof include pyrrolidones such as 2-pyrrolidone, 1-methyl-2-pyrrolidone, 1-ethyl-2-pyrrolidone, 1-propyl-2-pyrrolidone, 1-butyl-d-pyrrolidone, and the like. These are preferred in view of promoting the film formation of resin particles described later, and 2-pyrrolidone is more preferred.

The alkylene glycol ethers may be alkylene glycol monoether or diether, and are preferably alkyl ether. Examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether, and the like; and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methylethyl ether, diethylene glycol methylbutyl ether, triethylene glycol dimethyl ether, triethylene glycol diethyl ether, triethylene glycol dibutyl ether, triethylene glycol methylbutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, tripropylene glycol dimethyl ether, and the like.

The alkylene glycol constituting the alkylene glycol ethers preferably has a number of carbon atoms of 2 to 8, more preferably 2 to 6, still more preferably 2 to 4, and particularly preferably 2 or 3. The alkylene glycol constituting the alkylene glycol ethers may be an intermolecular condensate between hydroxyl groups of alkylene glycol.

The number of condensations of alkylene glycol is preferably 1 to 4, more preferably 1 to 3, and still more preferably 2 or 3.

The ether constituting the alkylene glycol ethers is preferably alkyl ether, preferably an alkyl ether having 1 to 4 carbon atoms and more preferably an alkyl ether having 2 to 4 carbon atoms.

The alkylene glycol ethers are preferred in view of excellent image quality because of excellent permeability and excellent wettability of an ink on a fabric. In view of this, monoether is particularly preferred.

Examples of polyhydric alcohols include alkanediols such as 1,2-alkanediol (for example, alkane diols such as ethylene glycol, propylene glycol (another name: propane-1,2-diol), 1,2-butanediol, 1,2-pentanediol, 1,2-hexanediol, 1,2-heptanediol, 1,2-octanediol, and the like), polyhydric alcohols (polyols) excluding 1,2-alkanediol (for example, ethylene glycol, propylene glycol, diethylene glycol, dipropylene glycol, triethylene glycol, 1,3-propanediol, 1,3-butanediol (another name: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, glycerin, and the like).

The polyhydric alcohols can be divided into alkane diols and polyols.

The alkanediols are diols of alkanes having 5 or more carbon atoms. The number of carbon atoms of alkanes is preferably 5 to 15, more preferably 6 to 10, and still more preferably 6 to 8, and 1,2-alkanediol is preferred.

The polyols are polyols of alkanes having 4 or less carbon atoms or intermolecular condensates between hydroxyl groups of polyols of alkanes having 4 or less carbon atoms. The number of carbon atoms of alkanes is preferably 2 or 3. The number of hydroxyl groups in polyol molecules is 2 or more, preferably 5 or less, and more preferably 3 or less. When a polyol is the intermolecular condensate, the number of intermolecular condensations is 2 or less, preferably 4 or less, and more preferably 3 or less. The polyhydric alcohols can be used alone or in combination of two or more.

The alkanediols and polyols can mainly function as a permeation solvent and/or moisture retention solvent. However, the alkanediols tend to have strong properties as a permeation solvent, while the polyols tend to have strong properties as a moisture retention solvent.

The alkanediols have strong property as a permeation solvent and are thus preferred in view of excellent ink spread due to excellent wettability of the ink on a fabric and excellent image quality.

The ink jet ink composition may use the organic solvents, exemplified above, alone or a combination of two or more. When two or more organic solvents are used, the content of organic solvents is a total content thereof.

The total content of organic solvents in the ink jet ink composition relative to the total amount of the ink jet ink composition is preferably 30.0% by mass or less and more preferably 20.0% by mass or less. On the other hand, the lower limit is preferably 10.0% by mass or more, more preferably 12.0% by mass or more, and still more preferably 15.0% by mass or more.

Further, the standard boiling point of the organic solvent contained in the ink jet ink composition is preferably 280.0° C. or less, more preferably 150.0° C. or more and 280.0° C. or less, still more preferably 170.0° C. or more and 280.0° C. or less, even still more preferably 180.0° C. or more and 280.0° C. or less, even still more preferably 190.0° C. or more and 270.0° C. or less, and even still more preferably 200.0° C. or more and 250.0° C. or less.

In addition, the ink jet ink composition preferably contains the organic solvent having a standard boiling point of 280.0° C. or more in an amount of 10.0% by mass or more and 30.0% by mass or less and more preferably 10.0% by mass or more and 20.0% by mass or less. Thus, the amount equal to or more than the lower limit value suppresses drying of the ink jet ink composition even when the endless belt is heated. Therefore, even when the ink jet ink composition is adhered to the endless belt, fixing to the endless belt is suppressed, and thus the endless belt is easily washed, thereby causing a tendency to enable a decrease in belt contamination. Also, the amount equal to or more than the lower limit value suppresses drying of the ink jet ink composition in nozzles, and thus ejection stability may be improved. In particular, the amount equal to or less than the upper limit value improves drying properties when the ink jet ink composition adhered to the fabric is dried by heating, and thus adhesion to the fabric can be improved. Examples of the organic solvent having a standard boiling point exceeding 280.0° C. include glycerin, polyethylene glycol monomethyl ether, and the like.

Surfactant

The ink jet ink composition used in the ink jet textile printing method according to the embodiment of the disclosure may contain a surfactant. The surfactant has the function of decreasing the surface tension of the ink jet ink composition and improving the wettability to the fabric. An acetylene glycol-based surfactant, a silicone-based surfactant, and a fluorine-based surfactant can be preferably used as the surfactant.

Examples of the acetylene glycol-based surfactant include, but are not particularly limited to, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all above trade names, manufactured by Air Products & Chemicals Inc.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all above trade names, manufactured by Nissin Chemical Industry Co., Ltd.), and Acetynol E00, E00P, E40, and E100 (all above trade names, manufactured by Kawaken Fine Chemical Co., Ltd.).

The silicone-based surfactant is not particularly limited but is, for example, preferably a polysiloxane-based compound. The polysiloxane-based compound is not particularly limited, but is, for example, polyether-modified organosiloxane or the like. Examples of a commercial product of the polyether-modified organosiloxane include BYK-306, BYK-307, BYK-333, BYK-341, BYK-345, BYK-346, and BYK-348 (the above trade names, manufactured by BYK Chemie Japan Co., Ltd.), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above trade names, manufactured by Shin-Etsu Chemical Co., Ltd.).

A fluorine-modified polymer is preferably used as the fluorine-based surfactant, and examples thereof include BYK-3440 (trade name, manufactured by BYK Chemie Japan Co., Ltd.), Surflon S-241, S-242, and S-243 (the above trade names, manufactured by AGC Seimi Chemical Co., Ltd.), Phthagent 215M (trade name, manufactured by Neos Co. Ltd.), and the like.

When the ink jet ink composition contains the surfactant, plural types may be contained. When the ink jet ink composition contains the surfactant, the content relative to the total mass is preferably 0.1% by mass or more 2.0% by mass or less, more preferably 0.2% by mass or more 1.5% by mass or less, and still more preferably 0.3% by mass or more 1.0% by mass or less.

pH Adjuster

The ink jet ink composition used in the ink jet textile printing method according to the embodiment of the disclosure may contain a pH adjuster. By containing the pH adjuster, for example, elusion of impurities from a member which forms an ink flow passage may be suppressed or promoted, and the washability of the ink jet ink composition may be adjusted.

Examples of the pH adjuster include ureas, amines, morpholines, piperazines, and aminoalcohols such as triethanolamine and the like. Specific examples thereof include urea, ethyleneurea, tetramethylurea, thiourea, 1,3-dimethyl-2-imidazolidinone and the like; betaines (trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, acetylcarnitine, and the like), and the like. Examples of amines include diethanolamine, triethanolamine (TEA), triisopropanolamine, and the like.

The compounds exemplified as the pH adjuster are handled as not being the organic solvent described above. For example, triethanolamine is liquid at room temperature and has a standard boiling point of about 208° C., but is not handled as the organic solvent described above.

When the ink jet ink composition contains the pH adjuster, plural types may be contained. When the ink jet ink composition contains the pH adjuster, the content relative to the total mass is preferably 0.2% by mass or more and 4.0% by mass or less, more preferably 0.4% by mass or more and 3.0% by mass or less, and still more preferably 0.6% by mass or more and 2.0% by mass or less.

Other

If required, the ink jet ink composition used in the ink jet textile printing method according to the embodiment of the disclosure may contain a chelating agent, an anti-rust agent, an anti-mold agent, an antioxidant, an antireductant, and various additives such as an evaporation accelerator, a water-soluble resin, and the like.

Examples of the chelating agent include ethylenediamine tetraacetate salt (EDTA), ethylenediamine nitrilotriacetate salt, hexametaphosphate salt, pyrophosphate salt, and metaphosphate salt, and the like.

1.2.1.5. Physical Properties Etc. Of Ink Jet Ink Composition

The ink jet ink composition used in the ink jet textile printing method according to the embodiment of the disclosure is adhered to the fabric by the ink jet method (ink adhesion). Therefore, the viscosity at 20° C. of the ink jet ink composition is preferably 1.5 mPa·s or more and 15.0 mPa·s or less, more preferably 1.5 mPa·s or more and 7.0 mPa·s or less, and still more preferably 1.5 mPa·s or more and 5.5 mPa·s or less. The ink jet ink composition is ejected and adhered to the fabric from the ink jet recording head, and thus a predetermined image can be efficiency easily formed on the fabric.

From the viewpoint of making proper the wet spreadability to the fabric, the surface tension at 25.0° C. of the ink jet ink composition used in the ink jet textile printing method according to the embodiment of the disclosure is 40.0 mN/m or less, preferably 38.0 mN/m or less, more preferably 35.0 mN/m or less, and still more preferably 30.0 mN/m or less.

1.2.1.6. Method for Producing Ink Jet Ink Composition

A method for producing the ink jet ink composition used in the ink jet textile printing method according to the embodiment of the disclosure is not particularly limited, but the composition can be produced by, for example, mixing the components described above in any desired order and, if required, removing impurities by filtration or the like. A method preferably used as a method for mixing the components includes adding in order materials to a vessel provided with a stirrer such as a mechanical stirrer, a magnetic stirrer, or the like, and then stirring and mixing the materials.

1.3. Other Process

The ink jet textile printing method according of the embodiment of the disclosure may include the following process.

1.3.1. Flame Retardant Processing

The ink jet textile printing method according to the embodiment of the disclosure may also include flame retardant processing. The flame retardant processing represents coating the fabric with a flame retardant.

The fabric coated with the flame retardant tends to have decreased adhesion to the endless belt having the adhesive layer, and thus the fabric is easily separated from the endless belt. In particular, when the endless belt is contaminated, the adhesiveness of the adhesive layer itself is decreased, and thus the fabric is more easily separated from the endless belt. Thus, printing of the fabric in a state of floating from the endless belt is not preferred because a printed image may be disturbed. However, the ink jet textile printing method according to the embodiment of the disclosure includes flame retardant processing, and thus even when the fabric is easily separated from the endless belt, contamination of the endless belt can be decreased. Therefore, a decrease in adhesiveness of the adhesive layer of the endless belt can be suppressed, and adhesion between the fabric and the endless belt can be improved, thereby decreasing disturbance of the printed image.

The flame retardant processing may be performed before or after the supporting and ink adhesion described above. In addition, the flame retardant may be coated in addition to the treatment of the fabric with the cationic polymer.

The flame retardant shows flame retardancy by itself and has the function of adding flame retardancy to the fabric. The flame retardant may have the function described above, and examples thereof include a bromine-based flame retardant which is a bromine atom-containing compound, a phosphorus-based flame retardant which is a phosphorus atom-containing compound, a chlorine-based flame retardant which is a chlorine atom-containing compound, a metal hydroxide-based flame retardant which is a metal hydroxide-containing flame retardant, an antimony-based flame retardant which is an antimony atom-containing compound, ammonium carbonate, zinc borate, zinc stannate, a molybdenum compound, melamine cyanurate, a triazine compound, a guanidine compound, a silicon polymer, a reactive-type vinyl group-containing flame retardant, an epoxy group-containing flame retardant, a carboxylic acid-containing flame retardant, and the like. One or two or more selected from these can be used in combination, but at least one selected from the group consisting of a bromine-based flame retardant, a phosphorus-based flame retardant, and a chlorine-based flame retardant is preferably contained. This can impart particularly excellent flame retardancy to the fabric coated with the flame retardant. These flame retardants have high transparency and thus have little adverse effect on the color tone of the fabric.

Examples of the bromine-based flame retardant include pentabromodiphenyl ether, octabromodiphenyl ether, decabromodiphenyl ether, tetrabromobisphenol A, hexabromocyclododecane, hexabromobenzene, and the like. Among these, decabromodiphenyl ether is particularly preferred.

Examples of the phosphorus-based flame retardant include aromatic phosphate esters such as triphenylphosphate and the like, red phosphorus, a halogen-containing phosphate ester and derivatives thereof, dimethyl-methylphosphonate oligomer, and the like. Among these, triphenylphosphate is particularly preferred.

Examples of the chlorine-based flame retardant include chlorinated paraffin, polybiphenyl chloride, and the like. Among these, chlorinated paraffin is particularly preferred.

Flame Retardant Solution

The flame retardant is preferably used as a flame retardant solution prepared by containing in a liquid because it can be easily coated on the fabric. The flame retardant solution may contain, besides the flame retardant, water, an organic solvent, a surfactant, etc. The water, organic solvent, and surfactant are the same as described above for the ink jet ink composition, and description thereof is omitted.

The lower limit of the content of the flame retardant in the flame retardant solution is preferably 3.0% by mass, more preferably 5.0% by mass, and still more preferably 10% by mass. The upper limit of the content of the flame retardant in the flame retardant solution is preferably 30% by mass, more preferably 25% by mass, and still more preferably 20% by mass.

Examples of a method for coating the fabric with the flame retardant include, but are not particularly limited to, a coating method of dipping the fabric in the flame retardant solution containing the flame retardant, a fabric coating method of impregnating a roller or the like with the flame retardant solution containing the flame retardant, a fabric coating method of ejecting the flame retardant solution containing the flame retardant from an ink jet recording heat by an ink jet method, and the like. The method for coating the fabric with the flame retardant solution by the ink jet method can be performed by using the recording apparatus 100 shown in FIG. 1 and FIG. 2 described above, 1.3.2. Other Processes Heating The ink jet textile printing method according to the embodiment of the disclosure may also include heating the endless belt 23 which supports the fabric 95 for the purpose of improving the friction fastness of an image.

Washing

The ink jet textile printing method according to the embodiment of the disclosure may also include washing the endless belt 23. The washing can be performed by, for example, using the washing section 51 of the recording apparatus 100 shown in FIG. 1 and FIG. 2 described above.

Drying

The ink jet textile printing method according to the embodiment of the disclosure may also include drying the fabric. The heating can be performed by, for example, using the heating unit 27 of the recording apparatus 100 shown in FIG. 1 and FIG. 2 described above.

2. Recording Apparatus

A recording apparatus according to an embodiment of the present disclosure performs recording by the ink jet textile printing method described above.

The recording apparatus 100 shown in FIG. 1 and FIG. 2 described above can be used as the recording apparatus according to the embodiment of the disclosure.

The recording apparatus according to the embodiment of the disclosure performs recording by the ink jet textile printing method described above, and thus in printing on the fabric, the cationic component can be prevented from permeating together with the ink to the back surface of the fabric, thereby decreasing contamination of the belt. Also, the cationic component is easily staid in the front surface of the fabric, and thus color development can also be improved.

3. Examples

The present disclosure is described in further detail below by examples, but the present disclosure is not limited to these examples. Hereinafter, "%" is on mass basis unless otherwise specified.

3.1. Preparation of Pretreatment Solution

The components were added to a vessel so as to provide each of the compositions shown in Table 1 below and mixed and stirred for 1 hour by using a magnetic stirrer, preparing a pretreatment solution according to each of examples and comparative examples. In Table 1 below, each numerical value represents % by mass. Ion exchange water was used as water and added so that the mass of the pretreatment solution was 100% by mass.

3.2. Preparation of Ink Jet Ink Composition

The components were added to a vessel so as to provide each of the compositions shown in Table 2 below, stirred for 1 hour by using a magnetic stirrer, and then filtered by using a PTFE-made membrane filter of 5.0 μm, preparing an ink jet ink composition. In Table 2 below, each numerical value represents % by mass. Ion exchange water was used as water and added so that the mass of the ink jet ink composition was 100% by mass. In the table, the content of UW-1527F represents an amount in terms of solid content.

TABLE 1

|  |  | Pretreatment solution 1 | Pretreatment solution 2 | Pretreatment solution 3 | Pretreatment solution 4 | Pretreatment solution 5 |
|---|---|---|---|---|---|---|
| Cationic material | Cationic polymer 1 | 1 |  |  |  |  |
|  | Cationic polymer 2 |  | 1 |  |  |  |
|  | Cationic polymer 3 (nonquaternary) |  |  | 1 |  |  |
|  | Calcium chloride |  |  |  | 1 |  |
|  | Magnesium chloride |  |  |  |  | 1 |
| Other solvent | Proxel XL2 | 0.2 | 0.2 | 0.2 | 0.2 | 0.2 |
|  | Pure water | Balance | Balance | Balance | Balance | Balance |

TABLE 2

| | |
|---|---|
| UW-1527F | 4.0 |
| PB15:3 | 3.5 |
| Glycerin | 12.8 |
| TEG | 4.5 |
| BTG | 0.7 |
| E1010 | 0.5 |
| TEA | 1 |
| Water | Balance |

Description of each of the components shown in Table 1 and Table 2 above is complemented.

Pretreatment Solution
  Cationic polymer 1: trade name "EP-1137", manufactured by Takamatsu Oil & Fat Co., Ltd., cationic polymer having quaternary ammonium base
  Cationic polymer 2: trade name "PAS-H-10L", manufactured by Nittobo Medical Co., Ltd., cationic polymer having quaternary ammonium base (diallyldimethylammonium chloride polymer, CAS No. 26062-79-3), weight-average molecular weight 200,000
  Cationic polymer 3: trade name "PAA-SA", manufactured by Nittobo Medical Co., Ltd., cationic polymer having primary amino group (polyallylamineamide sulfate salt, CAS No. 861901-41-9), weight-average molecular weight 12,000
  Proxel XL2: trade name manufactured by Lonza Ltd. preservative Ink Jet Ink Composition
  UW-1527F: manufactured by Ube Industries, Ltd., ETANACOLL (registered trade mark) UW series UW-1527F, resin particles composed of urethane-based resin
  PB15:3: C. I. Pigment Blue 15:3, cyan pigment
  TEG: triethylene glycol (reagent)
  BTG: butyl triglycol (triethylene glycol monobutyl ether)
  E1010: manufactured by Nissin Chemical Industry Co., Ltd., Olfine (registered trade mark) E1010, acetylene glycol-based surfactant
  TEA: triethanolamine (reagent)

3.3. Formation of Textile Printing Product

Cationic Polymer Treatment

As shown in Table 3 below, a sponge roller was sufficiently impregnated with each of the pretreatment solutions prepared as described above, and the roller was vertically and horizontally rolled three to four times on a fabric (100% polyester tropical (METSUKE 96 g/m$^2$, thickness 0.2 mm), flame-retardant-processed 100% polyester tropical, or 100% cotton) described in Table 3, to coat the fabric with the pretreatment solution as uniformly as possible. The coating amount of the pretreatment solution was 6.5 g per area of A4 size. The fabric coated with the pretreatment solution was dried by heating treatment in an oven at 160° C. for 2 and half minutes.

The fabric "flame-retardant-processed 100% polyester tropical" was produced by flame retardant processing on "100% polyester tropical (METSUKE 96 g/m$^2$, thickness 0.2 mm)" by impregnation with a solution containing triphenyl phosphate as a phosphorus-based flame retardant (manufactured by Tokyo Chemical Industry Co., Ltd.) (phosphoric acid flame retardant concentration: 15% by mass relative to 100% by mass of the solution), followed by liquid squeezing, natural drying, and then heat pressing. In Table 3, the fabric used in each of the examples is shown as "Use".

In addition, the weight of A4 size "100% polyester tropical (METSUKE 96 g/m$^2$, thickness 0.2 mm)" was about 6 g, and the amount of the cationic polymer adhered to the fabric of each of the examples was 1.1% by mass relative to 100% by mass of the fabric.

Formation of Textile Printing Product

Printing was performed by using the same apparatus as the recording apparatus 100 described above in the embodiment. Each of the fabrics subjected to the cationic polymer treatment described above was used as the fabric 95. In addition, "ATRASOL GP1 (ATR code: ATR1717)" manufactured by ATR CHEMICALS Inc. was used as the adhesive 29. A solid pattern image was formed on the fabric under the recording conditions including a recording resolution of 1440 dpi×720 dpi, an ink mass of 23 ng/dot and a A4-size recording range. The "solid pattern image" represents an image in which dots are recorded in all pixels as the minimum recording unit regions defined by the recording resolution. After printing, the image was dried by heating treatment in an oven at 160° C. for 8 minutes, forming a textile printing product.

TABLE 3

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Fabric | 100% polyester tropical | Use | Use | Use | | Use | Use | | |
| | Flame-retardant-processed 100% polyester tropical | | | | Use | | | | Use |
| | 100% cotton | | | | | | | Use | |
| Pretreatment solution | | Pretreatment solution 1 | Pretreatment solution 2 | Pretreatment solution 3 | Pretreatment solution 1 | Pretreatment solution 4 | Pretreatment solution 5 | Pretreatment solution 1 | Pretreatment solution 5 |
| Color development | | A | A | B | A | C | C | C | C |
| Belt contamination | | A | A | A | A | C | C | A | C |
| Precipitation of belt washing waste liquid | | A | A | A | A | C | C | A | C |
| Printing unevenness | | A | A | A | A | A | A | A | C |

3.4. Evaluation Method 3.4.1. Evaluation of Belt Washability

The ink jet ink composition prepared as described above was ejected and adhered to the fabric 95 under the recording conditions described above from a place where the fabric 95 treated by the cationic polymer reached the carriage movement section 45 (head unit). Then, when a portion of the endless belt 23 having the ink jet ink composition adhered thereto was passed through the washing section 51, reached to the medium adhesion section 60, and adhered to a new fabric 95, the degree of adhesion of the ink jet ink composition to the surface opposite to the recording surface of the fabric 95 was evaluated according to criteria below. The results are shown in Table 3. The evaluation result equal to or higher than "B" can be considered as having good washability.

Evaluation Criteria
A: There is no adhesion of the ink jet ink composition to the belt.
B: Adhesion of the ink jet ink composition to the belt is not visually observed, but when the belt is rubbed with a finger, the ink jet ink composition is adhered to the finger.
C: There is adhesion of the ink jet ink composition to the belt (visually observed).

3.4.2. Evaluation of Precipitation in Washing Waste

The presence of precipitation in the waste liquid produced by washing of the belt was evaluated according to the following criteria.
A: No precipitation is visually observed.
B: Precipitation is visually observed.

3.4.3. Evaluation of Color Development

The OD value of each of the textile printing products formed as described above was measured by using fluorescence spectrodensitometer ("FD-7" manufactured by Konica Minolta, Inc.), and color development was evaluated according to the following criteria. The evaluation result equal to or higher than "B" can be considered as having good color development.

Evaluation Criteria
A: An OD value of 1.42 or more
B: An OD value of 1.4 or more and less than 1.42
C: An OD value of less than 1.4

3.4.4. Evaluation of Printing Unevenness

The presence of printing unevenness of each of the textile printing products was evaluated according to criteria below. Printing unevenness easily occurs when the fabric is separated from the endless belt due to the occurrence of floating of the fabric. Therefore, the evaluation result "A" indicates that the fabric and the belt are sufficiently adhered to each other.

Evaluation Criteria
A: No printing unevenness is visually observed.
B: Printing unevenness is visually observed.

3.5. Evaluation Results

The results of the evaluation tests are shown in Table 3.

In the examples each including mounting and supporting the fabric on the endless belt having an adhesive layer, and adhering the ink, containing the pigment, the resin particles, and water, by the ink jet method, the fabric is composed of hydrophobic fibers and treated with the cationic polymer, and thus the good belt washability can be obtained, and precipitation in the washing waste liquid can be prevented, thereby decreasing contamination of the belt. Also, good color development can be achieved. In addition, comparison between Examples 1 and 2 and Example 3 indicates that the cationic polymer having quaternary ammonium base exhibits more excellent color development.

On the other hand, in each of the comparative examples, decrease in belt contamination or good color development cannot be obtained. In details, comparison between Examples 1 to 3 and Comparative Examples 1 and 2 indicate that the pretreatment solution not containing the cationic polymer exhibits poor results in the evaluation of any one of color development, belt washability, and washing waste precipitation. In addition, comparison between Examples 1 to 3 and Comparative Example 3 indicates that the fabric which is cotton, not polyester, shows poor color development.

The contents described below are derived from the embodiments described above.

According to an aspect of the disclosure, an ink jet textile printing method for printing on a fabric includes mounting and supporting the fabric on an endless belt having an adhesive layer, and adhering an ink containing a pigment, resin particles, and water by an ink jet method. The fabric is a fabric composed of hydrophobic fibers and is a fabric treated with a cationic polymer.

In the ink jet textile printing method according to the aspect described above, the cationic polymer may have, in its structure, any one cationic functional group selected from a primary amino group, a secondary amino group, a tertiary amino group, a quaternary ammonium base, an imino group, and an amide group.

In the ink jet textile printing method according to the aspect described above, the fabric may be composed of polyester, and the METSUKE of the fabric may be 40 to 180 g/m$^2$.

In the ink jet textile printing method according to the aspect described above, the cationic polymer may be adhered in an amount of 0.4% to 5% by mass relative to 100% by mass of the fabric.

The ink jet textile printing method according to the aspect described above may further include flame retardant processing.

According to an aspect of the disclosure, a recording apparatus performs recording by the ink jet textile printing method according to the aspect described above.

The present disclosure is not limited to the embodiments described above, and various modifications can be made. For example, the present disclosure includes substantially the same configuration as that described in the embodiments, for example, a configuration having the same function, method, and results, or a configuration having the same object and effect. The present disclosure also includes a configuration in which a portion not essential in the configuration described in the embodiment is replaced. Further, the present disclosure includes a configuration which can exhibit the same operational effect or achieve the same object as in the configuration described in the embodiment. Further, the present disclosure includes a configuration in which a known technology is added to the configuration described in the embodiment.

What is claimed is:

1. An ink jet textile printing method for printing on a fabric, the method comprising;
mounting and supporting the fabric on an endless belt having an adhesive layer;
heating the endless belt with a heater positioned proximate the endless belt to increase the adhesiveness of the adhesive layer; and
adhering an ink containing a pigment, resin particles, and water by an ink jet method,
wherein the fabric is a fabric composed of hydrophobic fibers; and
the fabric is a fabric treated with a cationic polymer.

2. The ink jet textile printing method according to claim 1, wherein the cationic polymer has, in its structure, any one cationic functional group selected from a primary amino group, a secondary amino group, a tertiary amino group, a quaternary ammonium base, an imino group, and an amide group.

3. The ink jet textile printing method according to claim 1, wherein the fabric is composed of polyester, and the METSUKE of the fabric is 40 to 180 g/m$^2$.

4. The ink jet textile printing method according to claim 1, wherein the cationic polymer is adhered in an amount of 0.4% to 5% by mass relative to 100% by mass of the fabric.

5. The ink jet textile printing method according to claim 1 further comprising flame retardant processing.

6. A recording apparatus for recording by the ink jet textile printing method according to claim 1.

7. The ink jet textile printing method according to claim 1, wherein the adhesive layer includes a hot-melt adhesive.

* * * * *